United States Patent

[11] 3,620,584

| [72] | Inventor | Ronald E. Rosensweig<br>Lexington, Mass. |
|------|----------|------------------------------------------|
| [21] | Appl. No. | 40,246 |
| [22] | Filed | May 25, 1970 |
| [45] | Patented | Nov. 16, 1971 |
| [73] | Assignee | Ferrofluidics Corporation<br>Burlington, Mass.<br>Continuation-in-part of application Ser. No. 865,281, Oct. 10, 1969, now abandoned.<br>This application May 25, 1970, Ser. No. 40,246 |

[54] MAGNETIC FLUID SEALS
21 Claims, 10 Drawing Figs.

[52] U.S. Cl. ............................................ 308/187.1, 277/80
[51] Int. Cl. ........................................... F16c 33/82, F16k 41/00
[50] Field of Search ..................................... 277/80, 53; 310/10; 308/187.1

[56] References Cited
UNITED STATES PATENTS

| 1,617,349 | 2/1927 | Sanders | 277/53 |
| 3,501,089 | 3/1970 | Alford | 277/53 |

FOREIGN PATENTS

| 763,373 | 12/1956 | Great Britain | 277/53 |
| 783,881 | 10/1957 | Great Britain | 277/80 |

*Primary Examiner*—Martin P. Schwadron
*Attorneys*—Richard P. Crowley and Richard L. Stevens

ABSTRACT: A modular magnetic fluid seal which comprises an outer ring and an inner ring within the outer ring and concentrically aligned therewith. The inner ring is spaced apart from the outer ring and secured thereto in a movable manner. Disposed between the rings and secured to the outer ring is a magnet. Adjacent to the magnet are pole pieces which define gaps with the inner ring. A magnetic fluid is captured in the gaps. The modular seal is inserted as a unit between surfaces such as a rotating shaft and a sleeve or collar. The inner ring is secured about the shaft in a fluidtight manner while the outer ring is secured in a fluidtight manner to the sleeve to provide a leakproof seal which may transmit rotary motion.

PATENTED NOV 16 1971

INVENTOR
RONALD E. ROSENSWEIG
BY
Crowley & Stevens
ATTORNEY

INVENTOR
RONALD E. ROSENSWEIG
BY
ATTORNEY

INVENTOR
RONALD E. ROSENSWEIG
BY

ATTORNEY

MAGNETIC FLUID SEALS

EARLIER COPENDING APPLICATION

This application is a continuation-in-part of my copending application Ser. No. 865,281, filed Oct. 10, 1969 now abandoned.

BACKGROUND OF THE INVENTION

In relatively moving parts, such as in bearing surfaces which may be lubricated, it is sometimes necessary to incorporate seals between surfaces to maintain a pressure differential across the seal or to prevent leakage of a lubricant along one of the surfaces. This is particularly true where a shaft passes from one environment at a first pressure into a second environment at another pressure.

Mechanical arrangements for incorporating a seal between surfaces such as to maintain a pressure differential on either side of the seal or to prevent leakage of a gas or liquid, such as a lubricant, through a seal are commonly used and generally may comprise one or more flexible sealing washers made from rubber or some similar material. However, these materials generally do not maintain a leakproof seal. It has also been suggested that a magnetic fluid be employed in a gap between such surfaces. Normally, a magnet is connected to a permeable pole piece to produce a magnetic field in an annular gap between the pole piece and the surface, such as a rotating shaft. Magnetic fluid is introduced into the gap where it is captured and serves as a barrier capable of supporting a pressure differential. See for example British Patent Specification 783,881, and U.S. Pat. No. 3,439,961.

However, this type of magnetic fluid seal which engages the rotating shaft and/or housing with which the shaft is directly associated has several drawbacks, one being that it is difficult to maintain a constant gap between the pole piece and the shaft to prevent rubbing of the pole piece with the shaft. This inability to maintain a constant gap is normally due to the magnetic attraction of the shaft to the pole pieces and the eccentricity of the shaft or vibrations which are caused during normal operation. This results in a magnetic fluid seal of varying strength because of the alternating dimension or width of the gap. Also the rubbing of the shaft and pole piece results in unwanted wear. To avoid this problem a sophisticated bearing design is required to ensure that the eccentricity of the rotating surface or bearing surface will be minimized.

Also, to make operational a magnetic fluid seal which is disposed between the bearing surfaces as has previously been done, the magnetic fluid must be filled at location. There was generally no way of prefilling the gap and this required the user to perform more operations to incorporate a magnetic fluid seal in the equipment on location. Further, the performance of the seal fluid combination could not be factory checked. In addition to the above drawbacks associated with the present magnetic fluid seals since the gap is defined by the pole pieces and the shaft of the apparatus, the shaft has to be made of a magnetic material in order to complete the magnetic circuit, otherwise a different seal design must be utilized for nonmagnetic shafts. In this situation a less effective seal is made because the pressure differential the seal can maintain is not as strong as when a magnetic shaft is used.

My invention comprises in part a multipole piece which defines a plurality of gaps with an opposed surface. A magnetic field is supplied to the gaps in parallel, from one permanent magnetic field source. Magnetic fluid is positioned in the gaps and a plurality of magnetic fluid seals arranged in serial relationship are provided. This embodiment eliminates the requirement for separate pole pieces and magnets required for a multistaged seal as taught by the prior art and therefore provides compactness of size for a fluid seal in addition to better economy in its manufacture. Other advantages are better reliability of performance and reduced power dissipation.

My invention also includes a new type of magnetic fluid seal which may be incorporated between moving surfaces and overcome the deficiencies of the present magnetic fluid seals now used. Briefly, my invention comprises a separate unit having inner and outer elements adapted to be moved relative to one another. A magnet is spaced apart from at least one of the surfaces to define gaps therebetween. The material from which the magnet is spaced apart is magnetic in nature whereby a magnetic circuit may be set up between the magnet and said surface and pass through the gap. A magnetic fluid is captured in the gap. This unit is then inserted between two relatively moving surfaces such as between a shaft and a housing and in addition to functioning as a seal, it may also function as either a bushing and/or a bearing. Each of the surfaces may be secured to the other bearing surfaces or the inner element may comprise an inner ring of zero inner diameter, such as a shaft.

In one embodiment my invention comprises a first outer ring-shaped element, a second inner ring-shaped element spaced apart from the outer element and further secured to the outer element in a movable manner. Disposed between the first and second elements is at least one magnetic pole piece secured to the inner peripheral surface of the outer element and spaced apart from the inner peripheral surface of the inner element to define a gap therebetween. The surface of the inner ring-shaped element comprises at least in part a material which allows the magnetic flux to pass therethrough. A magnetic fluid is captured within the gap. This magnetic fluid seal as assembled is adapted to be inserted between two surfaces. For example, the outer surface of the inner ring may be placed about a rotating shaft and secured thereto in a fluidtight manner while the outer surface of the outer ring may be secured to a housing which supports or functions in combination with the shaft and is secured thereto in a fluidtight manner. In operation the inner ring rotates with the shaft and the outer ring may or may not rotate with the bearing surface to which it is secured.

Accordingly, with my invention, a simple, economic, magnetic fluid seal utilizing magnetic-type fluids is provided wherein the entire unit may be separately assembled and the magnetic fluid inserted in one operation and the entire unit subsequently incorporated in an apparatus. A further distinct advantage of this invention is that the shaft on which the magnetic fluid seal is placed may be either magnetic or nonmagnetic. Also, the seal can be inserted or removed from the shaft or bearing surface without sliding the magnetic fluid along the bearing surface as in the prior art devices. In the prior art devices where the magnetic fluid contacted the rotating shaft or bearing surface directly, then when the shaft moved in a direction normal to the direction of rotation, some of the fluid would be lost by wetting, and further the shaft would be contaminated with the fluid. With my magnetic fluid seal the gap generally remains constant.

Other advantages of my magnetic fluid seal unit are that the modular design eliminates the requirement of filling the seal with the fluid by the user and simplifies shipping and storage procedures. Also, in the unlikely event of a failure of a seal, it may be replaced by another off-the-shelf seal and further, any apparatus in which the seal is incorporated may be disassembled and reassembled without having the problem of refilling the gap. Provision may also be made within the seal assembly to design for the desired clearances, eccentricities, and possible vibrations expected in a given environment, and the magnetic fluid is shielded from direct contact from adverse environments during handling and use.

This magnetic fluid seal may assume many various embodiments. For example, the inner ring may comprise a bushing which is secured in position between a plurality of magnetic pole pieces. In this embodiment the inner ring element or bushing is magnetically held within this seal in a central position. However, if it is desired to secure more positively the bushing in its position, then this may be done by the use of a step shaft and a staking operation. In another embodiment the inner ring element may be positively positioned within the seal assembly by thrust-bearing surfaces. In a still further embodiment the inner ring element may be an integral part of a shaft and the shaft itself may be magnetic; or in other words, the inner ring element may have a zero inner diameter. Alternatively, ball bearings or journal bearings may be used to position the inner ring element wherein the inner race of the bearing is secured to the inner ring element while the outer race is secured to or forms part of the outer ring element. Also, with all designs of my magnetic fluid seal unit either magnetic of nonmagnetic shafts may be accommodated with the same seal. This is possible since the inner ring element is magnetizable and provides the return path for magnetic flux.

DESCRIPTION OF THE PREFERRED EMBODIMENTS

Figure 1:
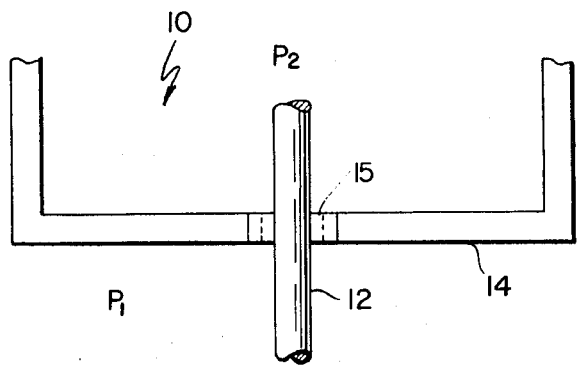
FIG. 1 is a schematic illustration of one embodiment of my invention.

In FIG. 1 is shown one environment in which my magnetic fluid seal may be used. A centrifuge 10 has a shaft 12 which passes through the lower portion thereof. The shaft 12 is driven by a motor or other means (not shown) and extends from an atmospheric environment, $P_1$, outside the centrifuge through the housing 14 of the centrifuge and into a vacuum environment, $P_2$. A magnetic fluid seal 15 is secured to the housing 14 about the shaft 12. This magnetic fluid seal ensures that there will be no leakage of air or pressure from the atmosphere where the shaft intersects the centrifuge housing.

Figure 2:
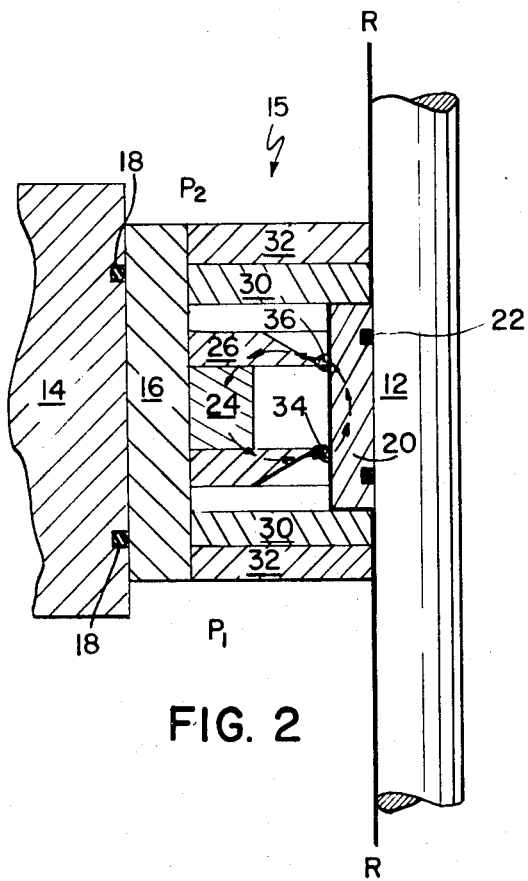
FIG. 2 is an enlarged sectional view of the magnetic fluid seal of FIG. 1.

Referring now to FIG. 2, the seal 15 is shown in greater detail and comprises an outer ring 16 having two static seals 18 located on the outer peripheral surface thereon. These static seals or O-rings 18 engage the inner peripheral wall of the housing 14 in a fluidtight manner. An inner ring or bushing 20 is spaced apart from and generally concentrically aligned with the outer ring 16. One or more static seals such as the O-rings 22 are disposed about the outer peripheral surface thereof. These O-rings 22 secured to the bushing 20 engage the shaft 12 in a fluidtight manner. The bushing 20 is limited in its longitudinal movement within the seal by the thrust bearings 30 which are secured to or abutted to and extend from the inner peripheral surface of the outer ring 16. As shown additional cover plates 32 extend from the inner peripheral surface of the outer ring 16 to protect the assembly during handling and operation. As seen this unit is particularly adapted for shipping and handling since the fluid is not visible and cannot be contacted hence making the unit easier to use in the field as by use with untrained personnel. A permanent magnet 24 is contained within the inner peripheral surface of the outer ring 16 and on either side of the magnet 24 are pole pieces 26 which extend inwardly toward the bushing 20.

Any type of permanent magnetic material may be used in my magnetic seal unit. For example, aluminum, nickel, cobalt compounds such an Alnico V and VIII; cobalt-samarium materials, rubber-bonded magnets, ceramics, and other iron-containing materials such as magnetite and ferrite may also be used.

The knife edges of the pole pieces 26 are spaced slightly apart from the bushing 22 and define therewith gaps 34. However, if desired, the pole pieces employed in my invention may also be doubly beveled, singly beveled, internally veed, etc., and the inner ring element may be brought to a knife edge and used against a flat or knife-edged pole piece.

The magnetic flux flows across the gaps and through the bushing. Magnetic fluid 36 is contained or captured in the gaps by the magnetic flux passing therethrough. The magnetic flux indicated by the arrows passes through a pole piece, the magnetic fluid in the gap, the bushing and through the return pole piece.

In this particular embodiment the outer ring 16 is secured to the housing 14. The bushing 20 which is magnetizable is secured to the shaft 12 and rotates therewith.

The pole pieces through which the magnetic flux passes have been described in regard to a material capable of being magnetized. Such materials are generally characterized by being soft magnetically or being very responsive to magnetism, that is, capable of high magnetic saturation although having no inherent magnetic characteristics of their own. For example, ferrous materials such as irons like wrought iron, cast iron, etc., may be used as well as iron alloys such as stainless steel.

The line R—R described the surfaces of rotation and as can be clearly seen the magnetic fluid maintains a complete pressuretight seal while stationary or rotating. Upon rotation of the shaft the seal remains pressuretight as the magnetic fluid remains captured in the gaps at all times. Accordingly, it is clear that a seal is maintained at all times between the different environments on either side of the magnetic seal whether the shaft is rotating or stationary. This embodiment clearly eliminates the problems of loss of the fluid on the shaft by wetting as well as contamination of the shaft by a magnetic fluid. Also another distinct advantage over the prior art devices is that the shaft 12 need not be magnetic to serve as a path of travel for the magnetic flux to maintain the magnetic fluid in the gap.

Any type of magnetic fluid may be used with my invention and include those magnetic fluids which comprise a carrier fluid like water, hydrocarbons, fluorocarbons, etc., a surface active agent such as fatty acids, for example a monounsaturated fatty acid like oleic acid, and any magnet-type particles such as ferrous materials like ferrite, chromium dioxide, magnetite, etc. Also, the invention has been described wherein the outer surface of the inner ring element is secured at least in part to a shaft through the use of a static seal such as an O-ring. It is possible for the inner ring element to be secured in other modes. For example, the seal between the surfaces may be achieved by a direct fluidtight fit between the surfaces such as by compression or expansion fits. Also, other materials may be interposed between the surfaces such as, for example various glue compounds or gasket-type materials such as Loctite.

Figure 3:
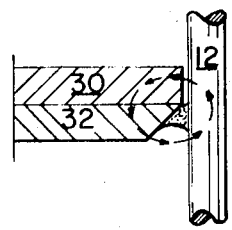
FIG. 3 is an alternative embodiment of FIG. 2.

Although the modular magnetic fluid seal has been described in reference to a particular environment of pressure differentials with a vacuum on one side and atmospheric pressure on the other side, it is obvious that this type unit may be used as a seal between different environments such as where there is a liquid on one side and a gas on the other side or a liquid–liquid environment of different viscosities and/or compositions on either side such as to prevent leakage of bearing lubricants. For example, it may be used to prevent entry of water into the motor of a sump pump wherein both the pump and a portion of the motor are submerged in water and as the water rises it contacts a flexible diaphragm on the bottom of the motor. The motor is then actuated by a spring-biased switch and the operation of the pump then commenced. This type of seal can be used to prevent leakage of water into the motor housing where the shaft which extends from the motor to the pump passes through the diaphragm. This type of seal may also be used in an environment wherein one side is an atmosphere of particulate material which may contaminate the magnetic fluid. For example, in FIG. 3 is shown an embodiment wherein a weak magnetic field is established at one end of the magnetic fluid seal and particulate matter such as iron filings may be collected at that point and prevented from progressing into the seal and contaminating the magnetic fluid.

Of course, the seal of my invention may be used in other environments such as to separate two different gasses at the same pressure or as a seal to prevent the leakage of refrigerant gasses and lubricant from a crankcase as in an air-conditioning system which is driven by mechanical shaft power. Further, it may be used for hermetically sealing vapors and liquids within a steam engine to prevent their escape to the atmosphere or conversely to prevent the movement of oxygen in the atmosphere into the steam engine.

Figure 4:
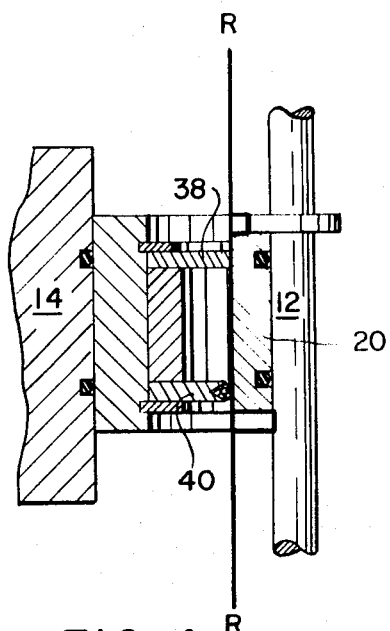
FIG. 4 is a sectional view of another embodiment of my invention.

FIG. 4 shows a simplified embodiment of my invention wherein the bushing is secured with a step shaft between pole pieces 38 and 40 having knife-type edges.

Figure 5:
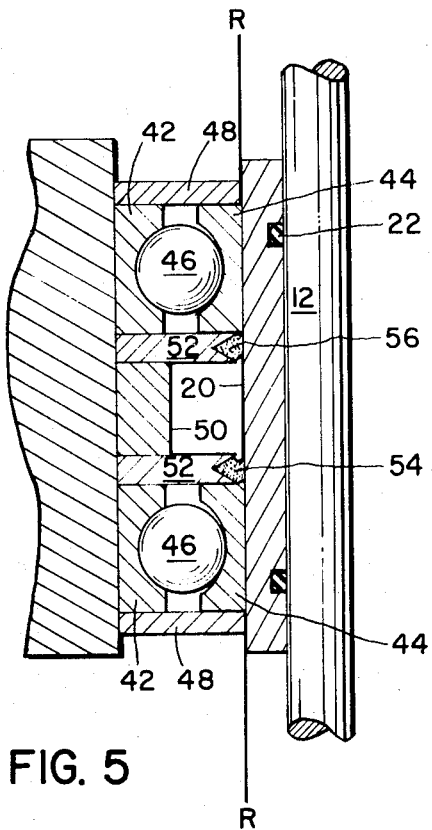
FIG. 5 is a sectional view of my invention in a form which incorporates a ball-bearing environment.

FIG. 5 shows a further embodiment of my invention wherein ball bearings are used to position the bushing. The inner race of the bearings is attached firmly to the bushing while the outer race is attached to the outer ring. Provision of the bearings permits better concentricity to be maintained between the shaft and the pole pieces. This in turn prevents wear and rubbing of relatively moving parts such as the pole piece, edges, and the bushing. Friction and torque to rotate the bushing or shaft relative to the case are minimized. Referring to FIG. 5, the bushing 20 is secured in a fluidtight manner to the shaft 12 by the use of static seals 22. Disposed within the unit are two sets of ball bearings which comprise an outer race 42 secured to the outer ring 16. The outer ring may be secured in turn to a housing having a moving surface or a fixed surface as desired. Secured to the bushing 20 in a fluidtight manner is an inner race 44. Disposed between the inner and outer races are ball bearings 46. At either end of the unit are cover plates 48. Secured between the ball bearings as shown is a permanent magnet 50 and disposed on either side thereof and terminating adjacent to the inner peripheral surface of the bushing 20 are pole pieces 52. The pole pieces shown are internally veed but other configurations may be used. The pole pieces 52 and the inner peripheral surface of the bushing 20 define gaps 54. A magnetic fluid 56 is held within the gap by the magnetic flux which passes through the pole pieces across the gap and through the magnetizable bushing 20 and back through the gap and pole piece to the permanent magnet 50 completing the circuit. If desired, both ball bearings may be placed on one side of the magnet or one or more ball bearings may be placed on either side of the magnet or on just one side.

The previously described embodiments have been described in reference to magnetic fluid seals having at least one or two magnetic seals within a given unit. However, at times it is desired that a plurality of seals within a specific unit be maintained in order to increase the effective pressure differential which the magnetic fluid seal will withstand. Accordingly, in FIG. 6 a plurality of pole pieces 58 are disposed on either side of a magnet 60 which is secured to an outer ring 62. The knife edges of the pole pieces 58 are spaced apart from the inner peripheral surface of a bushing 20 and define gaps therebetween as described before although, if desired, the knife edges may be formed from a single piece. A magnetic fluid is disposed within each of the gaps defined by the pole pieces and bushing 20. In a design of this nature the effect of each seal of magnetic fluid within each gap is generally cumulative across the entire seal and accordingly a much greater pressure differential may be maintained.

Figure 6:
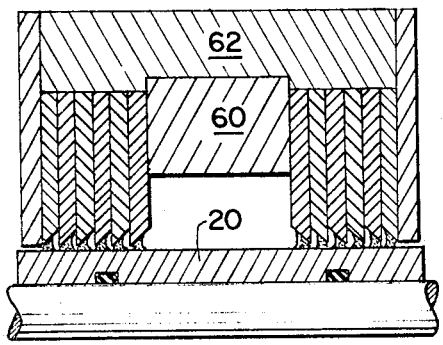
FIG. 6 is a sectional view of my invention employing a multistage seal within one unit.
Figure 7:
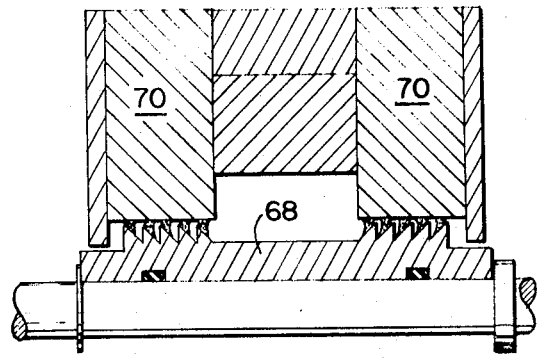
FIG. 7 is an alternative embodiment of FIG. 6.

An embodiment of the seal shown in FIG. 6 is shown in FIG. 7 wherein the knife edges 66 are formed in a bushing 68 and the knife edges are spaced apart from the pole pieces 70 to define gaps therebetween as described before.

Although my invention has been described in particular in reference to the movement of a shaft in combination with the bushing while the outer ring element of the seal unit remains static with respect to the housing, it is obvious the other ring element may move at the same speed, a greater speed or less speed than the bushing, either in the same direction as the bushing or the opposite direction. Also, the configuration of the ring elements may be in the form of a collar or sleeve and the outer ring element may have varying configurations about the outer periphery depending upon the size, shape and dimensions of the opening into which it is inserted. Also the inner ring element may form an integral part of a shaft.

Figure 8:
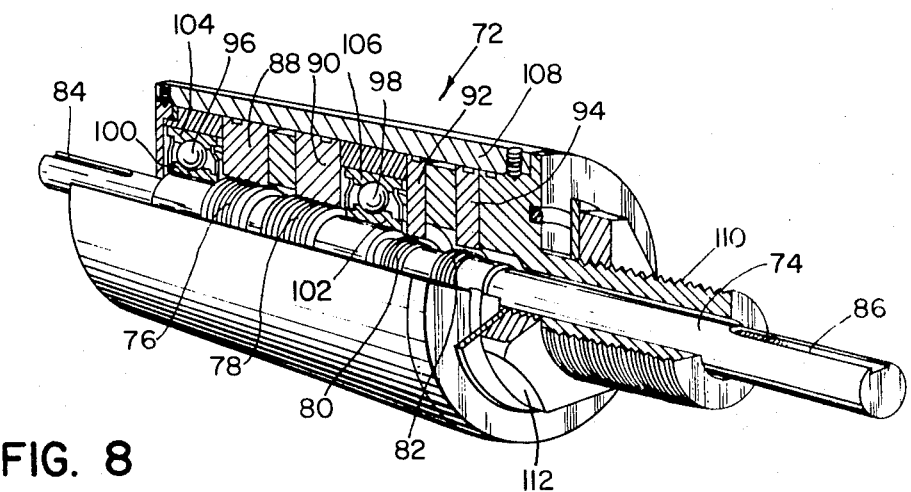
FIGS. 8 and 9 are sectional views of still further embodiments of my invention.

Referring to FIG. 8, a further embodiment of my invention is shown at 72 and comprises a centrally disposed shaft 74 having four sections of knife edges 76, 78, 80, and 82 formed thereon. The knife edges as shown are an integral part of the shaft 74. The sections may comprise separate inner ring elements of magnetic material compression fitted or otherwise statically sealed to the shaft or may be machined from a magnetizable shaft itself as is shown. The shaft is characterized by key ways 84 and 86 on either end thereof to provide direct coupling. Spaced apart from the knife edges are pole pieces 88, 90, 92, and 94 which define gaps between the pole pieces and corresponding knife edge sections. Magnetic fluid (not shown) is captured in the gaps. Ball bearings 96 and 98 are disposed between inner races 100 and 102 secured to the shaft 74 and adapted for rotation with respect to the outer races 104 and 106 which are secured to the outer element 108. The unit is characterized by a threaded end 110 disposed adjacent wrenching surfaces 112.

Figure 9:
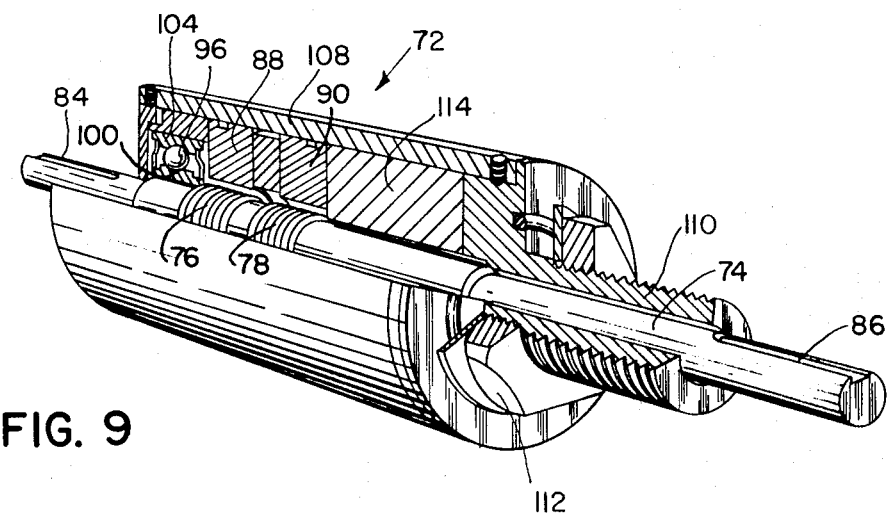
Figure 10:
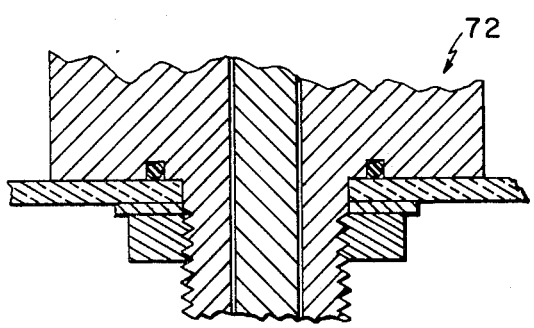
FIG. 10 is a schematic illustration of a working embodiment of my invention.

FIG. 9 is an alternative embodiment of FIG. 8 wherein the bearing 98, inner and outer races 102, 106, pole pieces 92, 94, magnet 90, knife edges 80 and 82 of FIG. 8 have been deleted and this entire section replaced with a journal bearing 114. Disposed between the inner surface of the bearing 114 and the outer surface of the shaft is a dry lubricant such as for example a plastic lubricant, such as a polyimide lubricant. FIG. 10 in schematic form shows the incorporation of the embodiment of FIG. 9 into a vessel such as shown in FIG. 1.

Another feature of the invention is the employment of a pole piece opposite a surface wherein the pole piece or the surface has a plurality of knife-type edges to define a plurality of gaps to position magnetic fluid therein such as shown in FIGS. 6, 7, 8, and 9. A magnetic field is supplied to a multiplicity of gaps, hence seal gaps, for example knife-type edges, while employing one permanent magnetic field source. As illustrated in FIGS. 7, 8, and 9 a plurality of knife edges are formed on the shaft or shaft bushing while in FIG. 6 the knife edges are formed on the pole blocks surrounding the shaft or bushing.

In the prior art in the employment of multiple magnetic fluid seals along a single shaft or moving surface, a separate magnet has been employed to drive each pair of stages, see for example British Patent Specification 783,881.

The present invention provides gaps arranged in parallel paths hence the magnetomotive force of one thin magnet is sufficient to supply magnetic flux to all the gaps. For a 30-stage seal such as shown in FIG. 8, the savings in length approximates a reduction in size of 300 to 400 percent in length over a 30-stage unit if constructed in accordance of the teachings of the precited British patent specification. Obviously, another advantage is the reduction in amount of magnets and pole pieces required for such multistage unit. Further by eliminating the need for separate magnets and many separate pole pieces, the present invention also eliminates the need to statically seal the leakage path each element introduces at its adjacent surfaces. Additionally, magnetic fluid may be simply painted on or applied to the shaft and the shaft slid into place. Once in place the magnetic field in each gap positions the fluid to create a coherent magnetic fluid seal ring at each gap. This multipole concept requires only a very small gas blowthrough to achieve interstage pressurization due to the small interstage volumes and provides a reduction in drag and power requirements for moving one surface relative to the other since with interstage pressurization a less viscous fluid may be employed without concern about excessive removal of fluid by spraying or atomization. The less viscous fluid in turn produces a reduction of drag and power at any given shaft rotation rate since the drag results from viscous shear. A further benefit is the lower temperature of operation.

A unit constructed in accordance with the specification of this invention is relatively inexpensive to manufacture since all the pole edges on a given piece may be machined in one setup and the tolerances are easily controlled. It eliminates machining of gasket grooves in many places and the machining or grinding of a number of surfaces which separate pole pieces would require. It also increases the seal life since due to small blowthroughs the multipole stage seals may be cyclically pressurized and depressurized a very great number of times without removal of liquid from the gaps. Although as described before the knife edges may be internally veed, externally veed and beveled, it is clear that the actual knife edges or the means to create the plurality of gaps may assume many configurations the purpose being to concentrate the flow of magnetic flux at the gaps to provide a plurality of gaps in substantially parallel relationship. Although described as a plurality of ring-type gaps in spaced apart parallel relationship, the embodiment may assume other configurations. For example, the knife-type edges may form a pattern of two or more overlapping helices or may be formed of other closed curve configurations.

Having described my invention, what I now claim is:

1. A magnetic fluid seal which comprises:
 a. a first element having a first surface;
 b. a second element having a second surface, the surfaces of the first and second elements defining a space therebetween;
 c. means to secure the first element to the second element in a movable manner;
 d. magnet means disposed within at least one element to provide a magnetic field;
 e. means to define in the space a plurality of gaps disposed on at least one side of the magnet means and in the flux path of the magnetic field of the magnet means, through which gaps magnetic flux passes to position magnetic fluid in the gaps, the gaps in a close but spaced apart relationship without magnet means intervening between said gaps, the flux for each of the gaps derived from the common magnetic field source; and
 f. magnetic fluid captured within the gaps to provide a plurality of close but spaced-apart separate magnetic fluid seals defining small interstage volumes therebetween whereby the space between the first and second surfaces of the elements is sealed and provides the capability of interstage pressurization wherein fluids of low viscosity may be employed and the spraying or atomization of the fluid minimized.

2. The seal of claim 1 wherein the means to secure the first element to the second element includes ball bearings.

3. The seal of claim 2 wherein said bearings are thrust bearings secured to the second element and disposed on either side of the magnet means.

4. The seal of claim 5 wherein the bearings are ball bearings disposed on either side of the magnet means, said ball bearings having at least an inner race and an outer race the inner race secured to the first element and the outer race secured to the second element.

5. The seal of claim 1 wherein the first element comprises a shaft, the magnet means is disposed within the second element and includes a magnet having pole pieces on either side thereof said pole pieces spaced apart from the surface of the shaft the shaft being characterized by first and second sets of knife edges on the surface thereof spaced apart from the pole pieces and defining in combination therewith gaps and further wherein the means to secure the second element to the first element in a movable manner includes bearing means.

6. The seal of claim 5 wherein the magnet means includes a plurality of magnets each of said magnets having at least one pole piece on either side thereof and corresponding sets of knife edges on the surface of the shaft spaced apart from said pole pieces, and wherein the bearing means includes ball-bearing means.

7. The seal of claim 5 wherein the magnet means includes a plurality of magnets each of said magnets having at least one pole piece on either side thereof and including a plurality of sets of corresponding knife edges on the surface of the shaft spaced apart from said pole pieces and further wherein the means to secure the inner element to the outer element includes a combination of ball bearings and journal bearings.

8. An apparatus having at least a first and second zone, partition means to separate the first zone from the second zone, a shaft passing from the first zone to the second zone through the partition means; means to seal the first zone from the second zone where the shaft passes through the partition means which comprises:
 a. a first element having a first surface;
 b. a second element having a second surface, the surfaces of the first and second elements defining a space therebetween;
 c. means to secure the first element to the second element in a movable manner;
 d. magnet means disposed within at least one element to provide a magnetic field;
 e. means to define in the space a plurality of gaps disposed on at least one side of the magnet means and in the flux path of the magnetic field of the magnet means, through which gaps magnetic flux passes to position magnetic fluid in the gaps, the gaps in a close but spaced-apart relationship without magnet means intervening between said gaps, the flux for each of the gaps derived from the common magnetic field source; and
 f. magnetic fluid captured within the gaps to provide a plurality of close but spaced-apart separate magnetic fluid seals defining small interstage volumes therebetween whereby the space between the first and second surfaces of the elements is sealed and provides the capability of interstage pressurization wherein fluids of low viscosity may be employed and the spraying or atomization of the fluid minimized.

9. The apparatus of claim 8 wherein the first zone is under a first pressure and the second zone is under a second pressure and the sealing means maintains the pressure differential without leakage.

10. The apparatus of claim 8 wherein the first zone contains a liquid and the sealing means prevents the flow of the liquid from the first zone to the second.

11. The seal of claim 1 wherein the means to define the gaps includes means to define the gaps in a parallel closely spaced relationship.

12. The seal of claim 1 wherein the means to define the gaps includes at least one set of knife edges spaced apart from one of said surfaces.

13. The seal of claim 24 wherein the first element is an outer element and the second element is an inner element disposed within the outer element and the knife edges are disposed on one or both of the surfaces.

14. The seal of claim 12 wherein the first element is an inner element, the second element is an outer element, and the knife edges are disposed on the surface of the outer element.

15. The seal of claim 1 wherein the means to define a plurality of gaps includes means to define a plurality of gaps disposed on either side of said magnet means.

16. The seal of claim 1 wherein the means to define a plurality of gaps includes a plurality of pole pieces.

17. The seal of claim 1 wherein the magnet means includes a magnet in combination with at least one pole piece disposed within the first element, the means to define a plurality of gaps includes a plurality of knife edges extending across the face of the pole piece.

18. The seal of claim 1 wherein the magnet means includes a magnet in combination with at least one pole piece, the magnet and pole piece disposed within the first element, the means to define a plurality of gaps comprises a plurality of knife edges disposed on the surface of the second element and spaced apart from the face of the pole piece along a distance at least coextensive with the face of said pole piece.

19. A magnetic fluid seal which comprises:
a. a first element having a first surface;
b. a second element having a second surface, the surfaces of the first and second elements defining a space therebetween;
c. means to secure the first element to the second element in a movable manner;
d. magnet means disposed within at least one element to provide a magnetic field;
e. at least one set of knife edges which define in the space a plurality of gaps, said knife edges disposed on at least one side of the magnet means and in the flux path of the magnetic field of the magnet means, through which gaps magnetic flux passes to position magnetic fluid in the gaps, the gaps in a close parallel but spaced-apart relationship without magnet means intervening between said gaps, the flux for each of the gaps derived from the common magnetic field source; and
f. magnetic fluid captured within the gaps to provide a plurality of close but spaced-apart separate magnetic fluid seals defining small interstage volumes therebetween whereby the space between the first and second surfaces of the elements is sealed and provides the capability of interstage pressurization wherein fluids of low viscosity may be employed and the spraying or atomization of the fluid minimized.

20. A magnetic fluid seal which comprises:
a. a first element having a first surface;
b. a second element having a second surface, the surfaces of the first and second elements defining a space therebetween;
c. means to secure the first element to the second element in a movable manner;
d. a magnet to provide a common magnetic field source in combination with at least one pole piece terminating at the first surface disposed within the first element;
e. a plurality of knife edges extending from the second surface of the second element, the knife edges defining in combination with the surface of the pole piece a plurality of gaps, the magnetic flux from the magnetic field source passing through the gaps to position magnetic fluid therein, the gaps in a close but spaced-apart relationship without a separate magnet intervening between said gaps, the flux for each of the gaps derived from the common magnetic field source; and
f. magnetic fluid captured within the gaps to provide a plurality of close but spaced-apart separate magnetic fluid seals defining small interstage volumes therebetween whereby the space between the surface of the pole piece and the second surface is sealed and provides the capability of interstage pressurization wherein fluids of low viscosity may be employed and the spraying or atomization of the fluid minimized.

21. The seal of claim 20 which includes two pole pieces, one disposed on either side of said magnet within the first element, two sets of knife edges extending from the second surface of the second element and defining in combination with the surfaces of the pole pieces gaps, the knife edges coextensive with the width of the pole pieces.

* * * * *

UNITED STATES PATENT OFFICE
CERTIFICATE OF CORRECTION

Patent No. 3,620,584     Dated November 16, 1971

Inventor(s) Ronald E. Rosensweig

It is certified that error appears in the above-identified patent and that said Letters Patent are hereby corrected as shown below:

In column 7, line 56, claim 4, please change the dependency from "5" to --3--.

In column 8, line 52, claim 13, please change the dependency from "24" to --12--.

Signed and sealed this 23rd day of May 1972.

(SEAL)
Attest:

EDWARD M. FLETCHER, JR.  ROBERT GOTTSCHALK
Attesting Officer         Commissioner of Patents